US010789043B2

(12) United States Patent
Lee et al.

(10) Patent No.: US 10,789,043 B2
(45) Date of Patent: Sep. 29, 2020

(54) ELECTRONIC APPARATUS, INPUT DEVICE AND METHOD FOR CONTROL THEREOF

(71) Applicant: SAMSUNG ELECTRONICS CO., LTD., Suwon-si (KR)

(72) Inventors: Yong-woo Lee, Hwaseong-si (KR); Chang-heon Yoon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/057,236

(22) Filed: Aug. 7, 2018

(65) Prior Publication Data
US 2019/0065142 A1 Feb. 28, 2019

(30) Foreign Application Priority Data

Aug. 31, 2017 (KR) .................. 10-2017-0111418

(51) Int. Cl.
G06F 3/16 (2006.01)
H04R 1/02 (2006.01)
G08C 17/02 (2006.01)
H04W 4/021 (2018.01)
H04R 1/24 (2006.01)

(52) U.S. Cl.
CPC ............ G06F 3/167 (2013.01); G08C 17/02 (2013.01); H04R 1/028 (2013.01); G08C 2201/31 (2013.01); H04R 1/24 (2013.01); H04R 2201/028 (2013.01); H04R 2205/022 (2013.01); H04W 4/021 (2013.01)

(58) Field of Classification Search
CPC ...... G06F 3/0416; G06F 3/044; G06F 3/0362; G06F 3/0412; G06F 3/04845; G06F 2203/04804
See application file for complete search history.

(56) References Cited

U.S. PATENT DOCUMENTS

| 4,636,758 | A | 1/1987 | Mettoudi |
| 4,946,108 | A | 8/1990 | König et al. |
| 5,334,075 | A | 8/1994 | Kakizaki et al. |
| 5,470,277 | A | 11/1995 | Romano |
| 5,485,006 | A | 1/1996 | Allen et al. |

(Continued)

FOREIGN PATENT DOCUMENTS

| KR | 10-2005-0106217 A | 11/2005 |
| KR | 10-1465967 B1 | 11/2014 |

(Continued)

OTHER PUBLICATIONS

Written Opinion dated Nov. 12, 2018, issued by the International Searching Authority in International Application No. PCT/KR2018/008822 (PCT/ISA/237).

(Continued)

Primary Examiner — William Lu
(74) Attorney, Agent, or Firm — Sughrue Mion, PLLC

(57) ABSTRACT

An electronic apparatus includes a sensor, a communicator and a processor that, based on sensing an input device being attached, identifies a control function assigned to an area to which the input device is attached, and based on receiving a signal corresponding to a predetermined physical operation from the input device through the communicator, performs a control operation corresponding to the received signal based on the identified control function.

19 Claims, 16 Drawing Sheets

(56) References Cited

U.S. PATENT DOCUMENTS

| | | | |
|---|---|---|---|
| 5,722,810 | A | 3/1998 | Young et al. |
| 5,863,057 | A | 1/1999 | Wessels |
| 5,961,541 | A | 10/1999 | Ferrati |
| 6,004,243 | A | 12/1999 | Ewert |
| 6,154,690 | A | 11/2000 | Coleman |
| 6,512,199 | B1 | 1/2003 | Blazina |
| 6,647,328 | B2 | 11/2003 | Walker |
| 6,809,661 | B1 | 10/2004 | Badarneh |
| 6,809,722 | B2 | 10/2004 | Mei et al. |
| 6,902,513 | B1 | 6/2005 | McClure |
| 6,910,895 | B1 | 6/2005 | Gevedon |
| 7,005,997 | B1 | 2/2006 | Wiewiura |
| 7,020,499 | B2 | 3/2006 | Moffi et al. |
| 7,429,931 | B2 | 9/2008 | Severson |
| 7,451,409 | B2 | 11/2008 | Eizips |
| 7,572,987 | B2 | 8/2009 | Fenn |
| 7,578,309 | B2 | 8/2009 | Breda |
| 7,584,045 | B2 | 9/2009 | Peretz |
| 7,704,147 | B2 | 4/2010 | Quraishi et al. |
| 7,793,218 | B2 | 9/2010 | Tsai et al. |
| 7,859,424 | B2 | 12/2010 | Severson |
| RE42,284 | E | 4/2011 | Severson et al. |
| 7,937,662 | B2 | 5/2011 | Tsai et al. |
| 7,938,358 | B2 | 5/2011 | Dietrich et al. |
| 8,202,244 | B2 | 6/2012 | Cohen et al. |
| 8,312,578 | B2 | 11/2012 | L'Hegarat et al. |
| 8,473,277 | B2 | 6/2013 | Jephcott |
| 8,528,931 | B2 | 9/2013 | Loureiro Benimeli |
| 8,653,701 | B2 | 2/2014 | Lai |
| 8,666,603 | B2 | 3/2014 | Morris |
| 8,693,661 | B2 | 4/2014 | Maly et al. |
| 8,707,900 | B1 | 4/2014 | Womble |
| 8,764,655 | B2 | 7/2014 | Yoo |
| 8,764,954 | B2 | 7/2014 | Wang et al. |
| 8,771,486 | B2 | 7/2014 | Wang et al. |
| 8,805,599 | B2 | 8/2014 | Hibbert |
| 8,994,771 | B2 | 3/2015 | Campbell, III et al. |
| 9,082,293 | B2 | 7/2015 | Wellman et al. |
| D736,184 | S | 8/2015 | Olivar |
| 9,174,536 | B2 | 11/2015 | Keist et al. |
| 9,233,041 | B2 | 1/2016 | Iheoma |
| 9,245,441 | B1 | 1/2016 | Poojary |
| 9,252,539 | B2 | 2/2016 | Condo et al. |
| 9,272,172 | B2 | 3/2016 | Choppla |
| 9,373,149 | B2 | 6/2016 | Abhyanker |
| 9,414,125 | B2 | 8/2016 | Ferren et al. |
| 9,690,400 | B2 * | 6/2017 | Krishnakumar .... G06F 3/03547 |
| 2007/0271048 | A1 * | 11/2007 | Feist ...................... H01C 10/12 |
| | | | 702/65 |
| 2008/0025172 | A1 * | 1/2008 | Holden ............. H04L 12/40117 |
| | | | 369/47.35 |
| 2008/0076559 | A1 | 3/2008 | Richardson et al. |
| 2008/0222432 | A1 * | 9/2008 | Gilbert ............... H01R 13/6675 |
| | | | 713/300 |
| 2009/0015368 | A1 * | 1/2009 | Serban ................... G06F 3/045 |
| | | | 338/47 |
| 2009/0198841 | A1 * | 8/2009 | Yoshida .............. G06F 13/4295 |
| | | | 710/16 |
| 2009/0278817 | A1 * | 11/2009 | Tai ........................ G06F 3/0488 |
| | | | 345/177 |
| 2009/0315725 | A1 * | 12/2009 | Hollander ................ H04Q 9/00 |
| | | | 340/584 |
| 2010/0277428 | A1 * | 11/2010 | Kumazawa ........... G06F 3/0338 |
| | | | 345/173 |
| 2011/0081154 | A1 * | 4/2011 | Ueda ...................... G03G 15/80 |
| | | | 399/13 |
| 2011/0210931 | A1 * | 9/2011 | Shai ........................ G06F 3/014 |
| | | | 345/173 |
| 2013/0083457 | A1 * | 4/2013 | Wurzel ................. G02F 1/1309 |
| | | | 361/679.01 |
| 2013/0120251 | A1 * | 5/2013 | Lee ........................ G06F 3/1438 |
| | | | 345/157 |
| 2013/0198867 | A1 * | 8/2013 | Ricci .................... G06F 13/4081 |
| | | | 726/29 |
| 2013/0200907 | A1 * | 8/2013 | Schneider ............ G06K 9/0002 |
| | | | 324/686 |
| 2014/0229747 | A1 * | 8/2014 | Jain ................... H04L 12/40045 |
| | | | 713/300 |
| 2014/0247246 | A1 | 9/2014 | Maus |
| 2015/0084900 | A1 * | 3/2015 | Hodges ................... G06F 1/1632 |
| | | | 345/173 |
| 2015/0169080 | A1 * | 6/2015 | Choi ....................... G06F 3/041 |
| | | | 345/174 |
| 2015/0290545 | A1 * | 10/2015 | Barney ..................... A63H 3/46 |
| | | | 463/32 |
| 2015/0373180 | A1 * | 12/2015 | Kari ........................ H02J 5/005 |
| | | | 455/556.1 |
| 2016/0291702 | A1 * | 10/2016 | Lee ......................... G06F 3/038 |
| 2017/0052617 | A1 * | 2/2017 | Okuzumi ................ B60R 16/02 |
| 2017/0304679 | A1 * | 10/2017 | Orfield ............... A63B 71/0622 |
| 2018/0074639 | A1 * | 3/2018 | Powell ..................... G06F 3/044 |
| 2018/0164930 | A1 * | 6/2018 | Goh ....................... G06F 3/0488 |
| 2019/0094311 | A1 * | 3/2019 | Yamada .............. H01M 10/482 |
| 2019/0204955 | A1 * | 7/2019 | Haga .................. G06F 3/04186 |

FOREIGN PATENT DOCUMENTS

| | | |
|---|---|---|
| KR | 10-2016-0118565 A | 10/2016 |
| WO | 2009/085338 A2 | 7/2009 |
| WO | 2016/085777 A1 | 6/2016 |

OTHER PUBLICATIONS

Communication dated May 20, 2020 issued by the European Intellectual Property Office in counterpart European Application No. 18852172.8.

* cited by examiner

ELECTRONIC APPARATUS, INPUT DEVICE AND METHOD FOR CONTROL THEREOF

CROSS-REFERENCE TO RELATED APPLICATIONS

This application is based on and claims priority under 35 U.S.C. § 119 to Korean Patent Application No. 10-2017-0111418, filed on Aug. 31, 2017, in the Korean Intellectual Property Office, the disclosure of which is incorporated by reference herein in its entirety.

BACKGROUND

1. Field

The disclosure relates to an electronic apparatus, an input device and a controlling method thereof, and more particularly, to an electronic apparatus that performs communication with an input device, an input device and a controlling method thereof.

2. Description of the Related Art

With the development of electronic technology, an electronic apparatus having various functions has been developed and widely used. However, there is a problem in that as the number of functions increases, the number of buttons for operating such functions proportionally increases.

Accordingly, many attempts have been made to electronic apparatuses such as placing a button for operating a function having a relatively higher importance and priority in one area of an electronic apparatus and a button for operating a function having a relatively low importance or priority in a remote control device only for the electronic apparatus, or replacing the button with a touch screen panel.

However, despite all those efforts, expectations of a user seeking a simple and high-level design have not been fulfilled.

SUMMARY

An aspect of the disclosure relates to an electronic apparatus which can be controlled by an input device that is removable and physically operated, an input device and a controlling method thereof.

In accordance with an aspect of the disclosure, there is provided an electronic apparatus, including: a sensor; a communicator; and a processor configured to: based on sensing an input device being attached to the electronic apparatus, identify a control function assigned to an area to which the input device is attached; and based on receiving a signal corresponding to a predetermined physical operation from the input device through the communicator, perform a control operation corresponding to the received signal based on the identified control function.

The electronic apparatus may include a storage configured to map and store information obtained by mapping identification information of each area among a plurality of areas where a different control function is assigned to each area, wherein the processor may be further configured to: based on a sensing value sensed through the sensor being a first sensing value, identify that the input device is attached to a first area among the plurality of areas, and identify a control function corresponding to the first area based on the stored information; and based on the sensing value sensed through the sensor being a second sensing value, identify that the input device is attached to a second area among the plurality of areas, and identify a control function corresponding to the second area based on the stored information.

The processor may be further configured to, based on a signal corresponding to a user voice input through a microphone of the input device being received from the input device, identify a predetermined command corresponding to the user voice, and perform a control operation corresponding to the predetermined command based on the identified control function.

The electronic apparatus may include a magnetic material in each area among a plurality of areas in a body, and wherein the processor may be further configured to, based on the input device being attached to an area, identify a control function mapped to identification information corresponding to a sensing value sensed in the area to which the input device is attached.

The processor may be further configured to, based on sensing the input device being detached, and receiving a signal corresponding to the predetermined physical operation from the input device, perform a control operation corresponding to the received signal based on a control function corresponding to the area to which the input device is most recently attached.

The electronic apparatus may include a storage configured to store information about a default control command corresponding to each of a plurality of physical operations, wherein the processor may be further configured to, based on sensing the input device being detached, and receiving a signal corresponding to a physical operation from the input device, perform a control operation according to a control command corresponding to the physical operation based on the information stored in the storage.

The electronic apparatus may include a power supply, wherein the power supply may be configured to, based on the input device being attached to an area, provide power for charging the input device to a charging terminal arranged in the area.

The input device may receive at least one from among a whirl operation and a button operation.

In accordance with another aspect of the disclosure, there is provided an input device that is removable from an electronic apparatus, the input device including: a sensor; a communicator; an input interface including at least one from among a whirl button and a press button; and a processor configured to, based on sensing through the sensor that the input device is attached to an area among a plurality of areas of the electronic apparatus, identify a control function with respect to the electronic apparatus which is assigned to the area to which the input device is attached, and control the communicator to transmit a control signal corresponding to a physical operation input through the input interface to the electronic apparatus based on the identified control function.

The processor may be further configured to, based on sensing the input device being detached, transmit a control signal corresponding to a physical operation input through the input interface to the electronic apparatus based on a control function corresponding to the area of the electronic apparatus to which the input device is most recently attached.

The input device may include a storage configured to store information about a default control command corresponding to each physical operation with respect to the input interface, wherein the processor may be further configured to, based on sensing the input device being detached, transmit a control signal corresponding to a physical operation input through the input interface to the electronic apparatus based on the information stored in the storage.

In accordance with another aspect of the disclosure, there is provided a method for controlling an electronic apparatus, the method including: sensing an input device being attached; identifying a control function assigned to an area among a plurality of areas to which the input device is attached; receiving a signal corresponding to a predetermined physical operation from the input device; and performing a control operation corresponding to the received signal based on the identified control function.

The sensing of the attachment of the input device may include: based on a sensing value sensed through a sensor being a first sensing value, identifying that the input device is attached to a first area among the plurality of areas, and based on the sensing value being a second sensing value, identifying that the input device is attached to a second area among the plurality of areas, and wherein the identifying of the control function may include: based on sensing that the input device is attached to the first area, identifying a control function corresponding to the first area, and based on sensing that the input device is attached to the second area, identifying a control function corresponding to the second area.

The receiving of the signal may further include: receiving a signal corresponding to a user voice that is input through a microphone of the input device, wherein the performing of the control operation may include identifying a predetermined command corresponding to the user voice and performing a control operation corresponding to the predetermined command based on the identified control function.

The electronic apparatus may include a magnetic material in each area among the plurality of areas in a body, and wherein the identifying of the control function may include, based on the input device being attached to an area, identifying a control function mapped to identification information corresponding to a sensing value sensed in the area to which the input device is attached.

The method may include, based on sensing the input device being detached and receiving a signal corresponding to the predetermined physical operation from the input device, performing a control operation corresponding to the received signal based on a control function corresponding to the area to which the input device is most recently attached.

The method may include, based on sensing the input device being detached and receiving a signal corresponding to a physical operation from the input device, performing a control operation according to a control command corresponding to the physical operation based on information about a default control command corresponding to each of a plurality of physical operations.

The method may include, based on the input device being attached to an area, providing power for charging the input device to a charging terminal arranged in the area.

The input device may receive at least one from among a whirl operation and a button operation.

According to the above-described various embodiments of the present disclosure, a user intuitively controls various functions of an electronic apparatus without a physical button.

DETAILED DESCRIPTION

Figure 1:
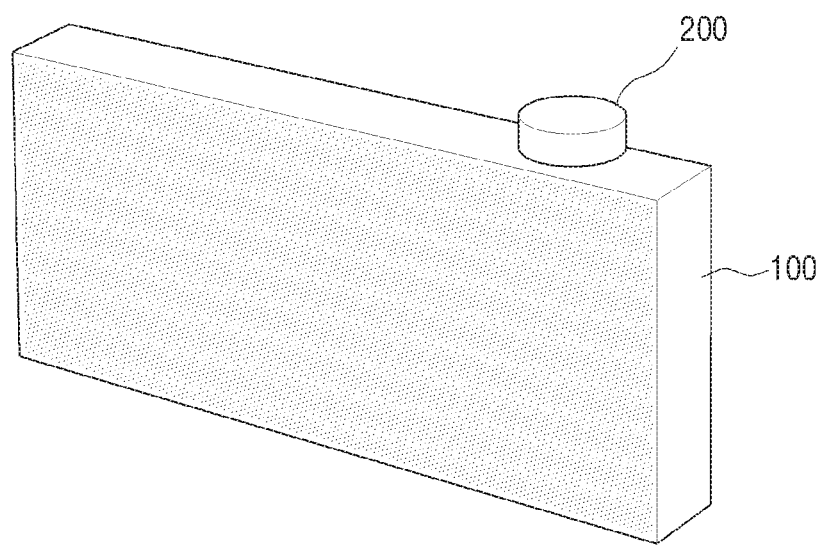
FIG. 1 is a view to explain an electronic apparatus system according to an embodiment.

Hereinafter, embodiments of the present disclosure will be described in detail with reference to the accompanying drawings. In order to clearly illustrate the present disclosure in the drawings, some of the elements that are not essential to the complete understanding of the disclosure are omitted for clarity. The present disclosure may be embodied in many different forms and is not limited to the embodiments described herein. Rather, these embodiments are provided so that the present disclosure will be more thorough and complete, and will fully convey the technical spirit of the present disclosure to those skilled in the art.

In addition, when an element is referred to as "including" a component, this indicates that the element may further include another component instead of excluding another component unless there is different disclosure. Further, various elements and regions in the drawings are schematically drawn. Accordingly, the technical spirit of the present disclosure is not limited by the relative size or spacing shown in the accompanying drawings.

FIG. 1 is a view to explain an electronic apparatus system 1000 according to an embodiment. Referring to FIG. 1, the electronic apparatus system 1000 may include an electronic apparatus 100 and an input device 200.

The electronic apparatus 100 may be an apparatus capable of outputting contents, for example, a display apparatus that outputs at least one of video contents and sound contents, a sound output apparatus, etc. However, the present disclosure is not limited thereto. The electronic apparatus 100 may be embodied as all types of apparatuses that perform a predetermined function according to a user operation. For example, the electronic apparatus 100 may be embodied as medical devices, sound devices and home appliances that can be controlled by a remote controller or an operation button. For example, the electronic apparatus 100 may be embodied as home appliances such as a microwave oven in which a heating temperature and a heating time is set by a user operation, an air conditioner in which a cooling and heating temperature is set, and the like.

According to an embodiment, the input device 200 may be attached to the electronic apparatus 100. When the input device 200 is attached to one area of the electronic apparatus 100, the electronic apparatus 100 may identify a control function corresponding to the area to which the input device 200 is attached, and perform a control operation corresponding to a signal received from the input device 200 based on the identified control function.

Conventionally, various types of buttons for controlling functions of the electronic apparatus 100 have been provided on one area of the electronic apparatus 100. For example, in case of TV, at least two physical buttons such as a channel control button, a volume control button, etc. may be provided. In other words, as functions of the electronic apparatus 100 vary, a plurality of buttons for controlling the functions may be provided on the electronic apparatus 100. However, the plurality of physical buttons may spoil the design of the electronic apparatus 100, and the size of the electronic apparatus 100 may unnecessarily increase due to the plurality of physical buttons.

Therefore, according to the present disclosure, the electronic apparatus 100 may be controlled by using the input device 200 which is removable from the electronic apparatus 100. The input device 200 may be a device that receives a physical operation of a user and transmits a signal corresponding to the physical operation of the user to the electronic apparatus 100 by performing communication with the electronic apparatus 100. For example, the input device 200 may be embodied as various types of devices that include at least one of a whirl button and a press button, and transmit a signal corresponding to a user operation input through the button to the electronic apparatus 100.

The input device 200 may be embodied as being capable of controlling a specific function of the electronic apparatus 100 based on a removable area of the input device 200.

Various methods for controlling the electronic apparatus 100 by using the input device 200 which is removable from the electronic apparatus 100 will be described.

Figure 2A:
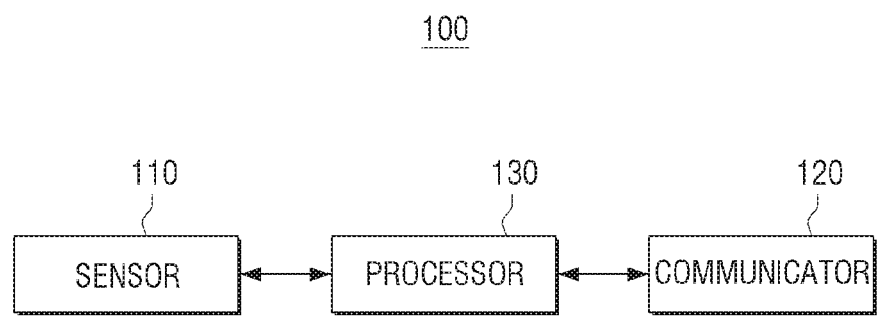
FIG. 2A is a block diagram illustrating an electronic apparatus according to an embodiment.

FIG. 2A is a block diagram to explain an electronic apparatus 100 according to an embodiment.

Referring to FIG. 2A, an electronic apparatus 100 may include a sensor 110, a communicator 120, and a processor 130.

The electronic apparatus 100 may include a removable area of the input device 200. A plurality of removable areas of the input device may be disposed in a housing of the electronic apparatus 100 (or at an outside of the electronic apparatus or on a surface of the electronic apparatus).

According to an embodiment, the area where the input device 200 is removable may include a magnetic material (or a magnetic substance), and the area may be engaged with the input device 200 by using a magnetic material and magnetic force included in the input device 200.

According to another embodiment, the area of the electronic apparatus 100 where the input device 200 can be attached and detached may include an engagement unit (or, a connection terminal) that can be physically engaged with an engagement unit (or, a combining unit) provided in the input device 200 and the two engagement units may be engaged with each other. However, the present disclosure is not limited thereto. If the input device 200 is attached to one area of the electronic apparatus 100 and the input device 200 perform communication with the area, various types of engaging methods may be used. For convenience of explanation, it is assumed that the area of the electronic apparatus 100 where the input device 200 is removable includes a magnetic material, and the area is engaged with the input device 200 by using a magnetic material and magnetic force included in the input device 200.

The sensor 110 may detect whether the input device 200 is detached or attached. According to an embodiment, the sensor 110 may be provided in each of a plurality of removable areas of the electronic apparatus 100. However, the present disclosure is not limited thereto. The electronic apparatus 100 may detect whether the input device 200 is detached or attached through one sensor 110.

The sensor 110 may be embodied as a resistance sensor including a specific resistance. However, the present disclosure is not limited thereto, but is embodied as a pressure sensor, an optical sensor, a magnetic sensor, etc. For example, a resistance sensor including a different resistance value may be provided in each of a plurality of areas.

According to an embodiment, a magnetic substance provided in the area where the input device 200 is removable may include its own resistance, and the resistance may operate as the sensor 110. The magnetic substances provided in different areas where the input device 200 is removable may include resistances having different resistance values. However, according to another embodiment, a resistance sensor separated from a magnetic substance provided in the area where the input device 200 is removable may be provided.

The communicator 120 may perform communication with the input device 200. The communicator 120 may receive a signal corresponding to a predetermined physical operation from the input device 200. The communicator 120 may perform interactive communication that transmits a signal to the input device 200 as well as receiving a signal from the input device 200. For example, the electronic apparatus 100 may transmit information on the identified control function corresponding to the area where the input device 200 is attached to the input device 200. The input device 200 may generate a signal based on information on the received control function and transmit the signal to the electronic apparatus 100. An example embodiment thereof will be described in detail with reference to FIG. 4.

The communicator 120 may perform communication with an external device in addition to the input device 200. For example, the external device may be implemented as a source device providing contents, a TV, a notebook, a tablet, a desktop, a set-top box, a game console, a mobile phone, etc.

The communicator 120 may communicate with the input device 200 and the external device according to various types of wire/wireless communication methods. The communicator 120 may perform communication using a communication method such as Bluetooth (BT), Wireless Fidelity (WI-FI), Zigbee, Infrared (IR), Serial Interface, Universal Serial Bus (USB), Near Field Communication (NFC), etc.

The processor 130 may identify a control function assigned to the area to which the input device 200 is attached based on sensing the attachment of the input device 200 through the sensor 110. For example, at least one area where the input device 200 is removable may be provided in a housing of the electronic apparatus 100.

When the input device 200 is attached to any one of the areas where the input device 200 is removable, the processor 130 may identify the area to which the input device 200 is attached, and identify a control function assigned to the area to which the input device 200 is attached. For example, a corresponding control function may be pre-assigned to at least one area where the input device 200 is removable provided in the housing of the electronic apparatus 100, the corresponding information may be stored, and the processor 130 may identify the control function assigned to the area to which the input device 200 is attached based on the pre-stored information.

The processor 130 may identify a state where the input device 200 is attached based on a signal received from the sensor 110, and identify a control function assigned to the area to which the input device 200 is attached. For example, when the input device 200 is attached to a first area among a plurality of areas of the electronic apparatus 100, the processor 130 may identify whether the input device 200 is attached to the first area based on a first sensing value received from the sensor 110 and identify a control function assigned to the first area. In some cases, the processor 130 may activate the identified control function. Activating a control function may refer to activating a function unit related to the control function (e.g., power supply, etc.).

Based on a signal being received from the input device 200, the processor 130 may perform a control operation corresponding to a signal received based on the identified control function. For example, when the electronic apparatus 100 is a sound output apparatus, and a control function assigned to the first area is an EQ control function, the EQ of the electronic apparatus 100 may be controlled corresponding to a physical operation of a user with respect to the input device 200.

A sensing value may be received in various manners according to an embodiment of the sensor 110.

When the sensor 110 is embodied as a resistance sensor, a sensing value received from the sensor 110 may be a sum of a characteristic resistance value R of the input device 200 and a characteristic resistance value Rx of a resistance of the area to which the input device 200 is attached, and the processor 130 may identify an area to which the input device 200 is attached and a control function corresponding thereto based on the received sensing value. For example, when a sensing value received from the sensor 110 is R+R2, the processor 130 may identify that the input device 200 is attached to a second area and identify a control function assigned to the second area based thereon. According to another embodiment, an area to which the input device 200 is attached may be identified only based on a characteristic resistance value of the resistance included in the area where the input device 200 is attached regardless of a characteristic resistance value of the input device 200. For example, when a sensing value received from the sensor 110 is R1, the processor 130 may identify that the input device 200 is attached to the first area and identify a control function assigned to the first area.

According to another embodiment, the processor 130 may identify an area to which the input device 200 is attached based on the received sensing value according to a resistance value of the resistance included in a magnetic substance of the area to which the input device 200 is attached and a resistance value of the resistance included in a magnetic substance of the input device 200. In this case, without a separate resistance sensor, whether the input device 200 is attached and the area to which the input device 200 is attached may be identified through the resistance included in the magnetic substance.

According to another embodiment, the processor 130 may receive a sensing value from a pressure sensor provided in the area where the input device 200 is removable. When the pressure sensor detects a pressure change according to the attachment of the input device 200, the processor 130 may identify whether the input device 200 is attached and the area to which the input device 200 is attached based on a sensing value sensed by a pressure sensor.

According to another embodiment, the sensor 110 may be embodied as an optical sensor. The optical sensor may be a sensor that detects an intensity of light reflected after ultrasonic waves or infrared rays are emitted and when the optical sensor detects a change in intensity of light according to the attachment of the input device 200, the processor 130 may identify whether the input device 200 is attached and an area to which the input device 200 is attached based on a sensing value sensed by the optical sensor.

The processor 130 may identify the area to which the input device 200 is attached among the plurality of areas based on the sensing value sensed by the sensor 110.

When the area to which the input device 200 is attached is identified, the processor 130 may identify a control function assigned to the identified area. The control function assigned to the identified area may refer to a control function included in the electronic apparatus 100, which is assigned differently to each of a plurality of areas. For example, if a sensing value sensed through the sensor 110 is a first sensing value, the processor 130 may identify that the input device 200 is attached to the first area among the plurality of areas, and identify the control function corresponding to the first area. If a sensing value sensed through the sensor 110 is a second sensing value, the processor 130 may identify that the input device 200 is attached to the second area among the plurality of areas and identify the control function corresponding to the second area.

According to an embodiment, when the control function corresponding to the second area is a 'radio frequency control function', the radio frequency of the electronic apparatus 100 may be adjusted corresponding to the physical operation of a user with respect to the input device 200. Although the signal received from the input device 200 is the same, if the area to which the input device 200 is attached is different, the electronic apparatus 100 may perform a different control operation.

Based on receiving a signal including a user voice input through a microphone included in the input device 200, the processor 130 may identify a preset command corresponding to a user voice. A typical voice recognition technique or a conventional technique for voice command identification may be used. The detailed description thereof will be omitted.

Based on a preset command corresponding to a user voice being identified, the processor 130 may perform a control operation according to the control function identified according to the attachment of the input device 200 and a preset command. For example, when a command for increasing a specific setting value is identified since 'up' is included in a user voice, and a control function assigned to the area to which the input device 200 is attached is a 'volume control function', the processor 130 may increase the volume. The processor 130 may perform a control operation considering both a user voice and a control function assigned to the area to which the input device 200 is attached.

Figure 2B:
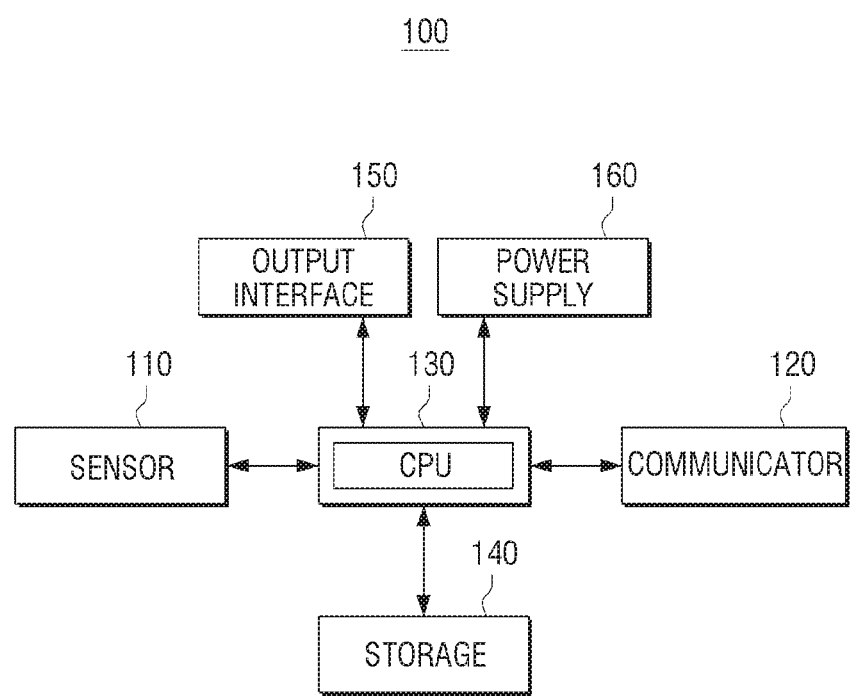
FIG. 2B is a detailed block diagram illustrating a configuration of the electronic apparatus shown in FIG. 2A.

FIG. 2B is a detailed block diagram illustrating configuration of the electronic apparatus 100 shown in FIG. 2A.

Referring to FIG. 2B, an electronic apparatus 100 may include a sensor 110, a communicator 120, a processor 130, a storage 140, an output unit 150 (e.g., output interface) and a power unit 160 (e.g., power supply). The redundant description of the constituent elements in FIG. 2B same as those in FIG. 2A will be omitted.

The processor 130 according to an embodiment may control the overall operation of the electronic apparatus 100. The processor 130 may include one or more of a digital signal processor (DSP), a central processing unit (CPU), a controller, an application processor (AP), or a communication processor (CP)), an ARM processor, or the like, or may be defined by one of them.

The processor 130 may include a CPU, a ROM (or non-volatile memory) that stores a control program for controlling the electronic apparatus 100, and a RAM (or a volatile memory) that stores data input from the outside of the electronic apparatus 100 or is used as an area corresponding to various tasks performed by the electronic apparatus 100.

The CPU may access the storage 140 and perform booing by using O/S stored in the storage 140. The CPU may perform various operations using various types of programs, contents and data stored in the storage 140.

The storage 140 may store various data such as an Operating System (O/S) software module for driving the electronic apparatus 100, various data such as multimedia contents, etc.

Information obtained by mapping identification information of each of the plurality of areas where a different control function is assigned to a different control function may be mapped and stored in the storage 140. Identification information may refer to information on a correlation between a sensing value sensed by the sensor 110 and each of the plurality of areas where the input device 200 is removable. For example, a first sensing value may be a sensing value sensed by the sensor 110 when the input device 200 is attached to the first area, and a second sensing value may be a sensing value sensed by the sensor 110 when the input device 200 is attached to the second area. The processor 130 may identify the area where the input device 200 corresponding to a sensing value is attached based on the information stored in the storage 140. For example, when a sensing value is a resistance value, as the input device 200 is attached to a specific area, the processor 130 may identify an area corresponding to a value Rx+R obtained by a sum of a characteristic resistance value Rx in a specific area and a characteristic resistance value R of the input device 200. The identification information may be a resistance value corresponding to each of the plurality of areas, and a sensing value corresponding to the first area may be R1+R, and a sensing value corresponding to the second area may be R2+R.

However, the present disclosure is not limited thereto, but various types of identification information that distinguishes each of the plurality of areas according to a sensing value sensed by the sensor 110 may be stored in the storage 140 and the processor 130 may identify the area to which the input device 200 is attached based thereon.

The storage 140 may store information on a control function mapped to each of the plurality of areas. The control function mapped to each of the plurality of areas may be different for each area. For example, a control function assigned to the first area and a control function assigned to the second area may be different. Accordingly, the processor 130 may identify the control function corresponding to the area to which the input device 200 is attached. The electronic apparatus 100 may perform a control operation corresponding to a signal received from the input device 200 based on the identified control function.

The storage 140 may be embodied as an internal memory such as ROM, RAM, etc. included in the processor 130, or embodied as a memory separated from the processor 130. The storage 140 may be embodied as a memory embedded in the electronic apparatus 100 according to data storage purpose, or embodied as a memory that can be detachably attached to the electronic apparatus 100. For example, data for driving the electronic apparatus 100 may be stored in a memory embedded in the electronic apparatus 100, and data for an expansion function of the electronic apparatus 100 may be stored in a memory that can be detachably attached to the electronic apparatus 100. A memory embedded in the electronic device 100 may be implemented as a nonvolatile memory, a volatile memory, a hard disk drive (HDD), or a solid state drive (SSD), and a memory that can be detachably attached to the sound output apparatus 100 may be implemented as a memory card (e.g., a micro SD card, a USB memory, etc.), an external memory that can be connected to a USB port (e.g., a USB memory), and the like.

According to an embodiment, when the electronic apparatus 100 is the electronic apparatus 100 that outputs contents such as a display apparatus or a sound output apparatus, the electronic apparatus 100 may include the output unit 150.

The output unit 150 may be embodied as at least one of a display that provides various content screens that can be provided by the electronic apparatus 100 and a speaker that outputs a rendered sound signal.

The content screen may include various contents such as images, videos, texts, music, etc., an application execution screen including various contents, a Graphic User Interface (GUI) screen, etc.

The display may be implemented as various types of displays such as a liquid crystal display, an organic light-emitting diode, liquid crystal on silicon (LCoS), digital light processing (DLP), and the like. The display may also be implemented as a transparent display that is embodied with a transparent material and displays information.

The output unit 150 may be embodied as a touch screen having a layer structure with a touch pad, and in this case, the output unit 150 may be used as a user interface in addition to an output device.

When the output unit 150 includes a speaker, the output unit 150 may output a rendered sound signal. The speaker may be embodied as one or more speaker units. For example, the speaker may include a plurality of speakers for multi-channel reproduction. For example, the speaker may include a plurality of speakers each involving a channel where sounds are mixed and output. In some cases, a speaker that involves at least one channel may be embodied as a speaker array including a plurality of speaker units for reproducing different frequency bands.

The electronic apparatus 100 may include the power unit 160 and provide power for charging the input device 200 to a charging terminal through the power unit. To be specific, when the input device 200 is equipped with a battery unit and driven using power charged by the battery unit, the electronic apparatus 100 may supply power for charging the input device 200 while the input device 200 is attached. A charging terminal may be arranged in each of the areas where the input device 200 is removable, and the power unit provided in the electronic apparatus 100 may supply power to the charging terminal. It should be noted that an LED for displaying a charging state may be additionally provided in the electronic apparatus 100. For example, an LED corresponding to each of a plurality of areas may be provided so that an LED corresponding to the area to which the input device 200 is attached may be turned on, whether the input device 200 is being charged, whether the charging is completed, and the amount of power may be provided through LEDs.

FIGS. 3A to 3F are views to explain an electronic apparatus according to an embodiment.

Figure 3A:
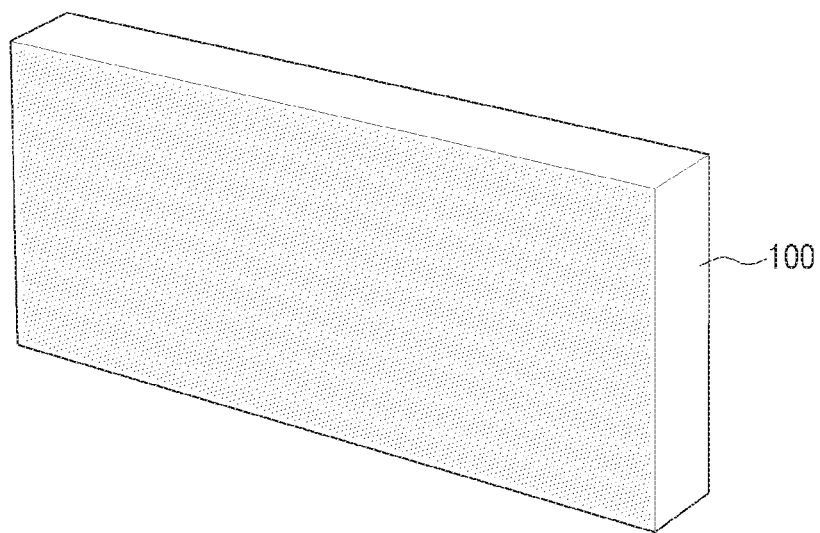
FIGS. 3A to 3F are views illustrating an electronic apparatus according to one or more embodiments.

Referring to FIG. 3A, the electronic apparatus 100 may be embodied as a sound output apparatus.

When the electronic apparatus 100 is embodied as a six-sided object, a plurality of areas where the input device 200 is removable may be provided at an upper side of the electronic apparatus 100. For example, a guide that indicates that the input device 200 is removable may be provided in each of the plurality of areas. When the input device 200 is attached to the area where the guide is provided, the electronic apparatus 100 may identify a control function assigned to the area to which the input device 200 is attached, perform a control operation corresponding to a signal received from the input device 200 based on the identified control function. For example, when it is identified that a volume control function is assigned to the area to which the input device 200 is attached, a signal corresponding to a user operation that rotates a whirl button to the right side is received, and the received signal is identified as a control signal that increases a volume setting value, the electronic apparatus 100 may increase a volume value based on the control signal.

According to another embodiment, when a control function corresponding to the area to which the input device 200 is attached is a channel setting function and the received signal is a control signal for increasing a specific setting value, the electronic apparatus 100 may increase a channel value (e.g., Ch. 9→Ch. 10). Even if the control signal transmitted from the input device 200 to the electronic apparatus 100 is the same, the electronic apparatus 100 may perform a different control operation according to the area to which the input device 200 is attached.

Figure 3B:
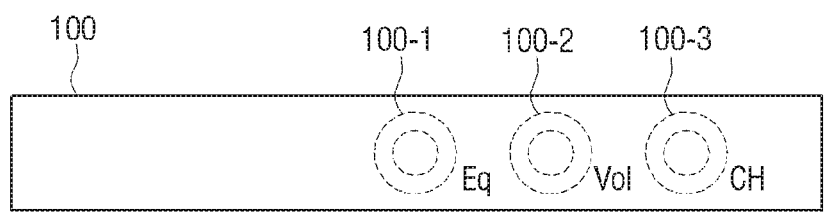

FIG. 3B is a top plane view of the electronic apparatus 100 viewed from above.

Referring to FIG. 3B, the electronic apparatus 100 may include an indication that represents a control function assigned to each area. For example, the electronic apparatus 100 may include first, second and third areas 100-1, 100-2 and 100-3 as the areas where the input device 200 is removable and include an indication that represents (or implies) a control function assigned to each of the first, second and third areas 100-1, 100-2 and 100-3. The first area 100-1 may be marked with 'Eq' indicating that it is possible to control the Eq. The input device 200 may be attached to the first area so that the Eq related function of the electronic device 100 may be controlled. The second area 100-2 may be assigned a volume control function and marked with 'Vol'. The third area 100-3 may be assigned a channel control function and marked with 'Ch'. As an example, the area where the input device 200 is removable may include a plurality of areas depending on the functions included in the electronic device 100, the purpose of the manufacturer, and the like. A control function assigned to each of the plurality of areas may be variously set depending on the user setting, the purpose of the manufacturer, and the like.

The indication that represents a control function assigned to each area may be displayed through a display provided in the electronic apparatus 100 according to an embodiment. However, the present disclosure is not limited thereto, but various embodiments may be implemented without an indication that represents a control function assigned to each area.

Figure 3C:
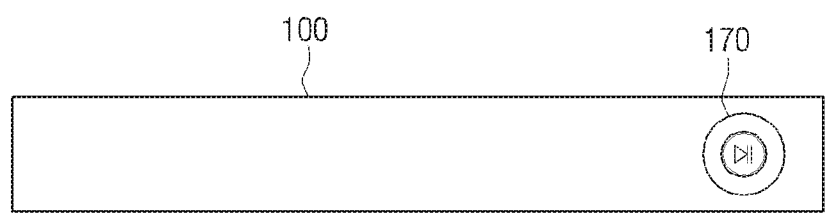
Figure 3C:
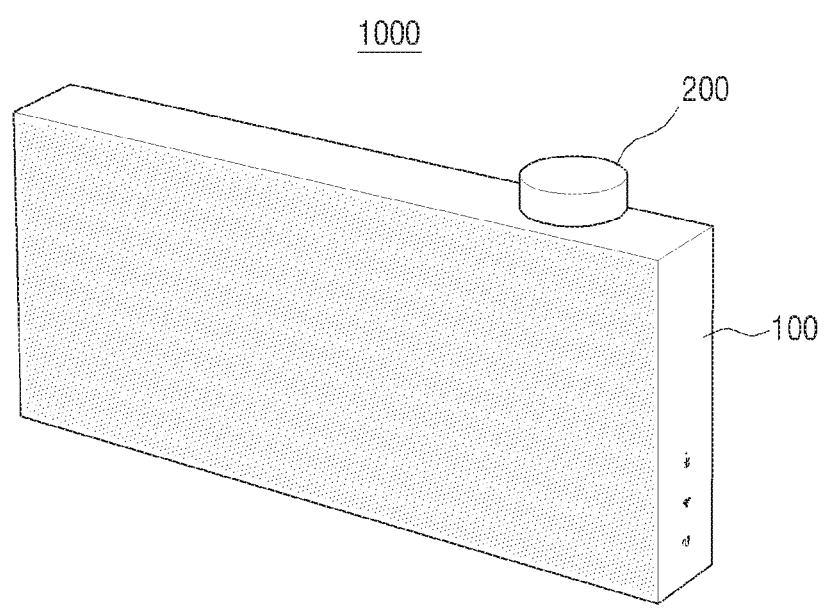

FIG. 3C is a plane view illustrating the electronic apparatus 100 viewed from above and a front view illustrating an electronic apparatus system 100 according to another embodiment.

Referring to FIG. 3C, the electronic apparatus 100 may include the input unit 170 (e.g., input interface) on one area. For example, a button for executing and controlling a specific function may be provided at the upper side of the electronic apparatus 100. The electronic apparatus 100 may perform a control operation corresponding to a user input with respect to the above described button without the input device 200.

The input device 200 according to another embodiment may be attached to the input unit 170 of the electronic apparatus 100. FIG. 3C is a front view of the electronic apparatus system 1000 where the input device 200 is attached to the input unit 170 of the electronic apparatus 100. For example, the input unit 170 may include a button which is physically operated and a magnetic material. Accordingly, the input device 200 may be attached to the electronic apparatus 100 by using the engagement between the magnetic material included in the input device 200 and the magnetic material included in the input device 170.

According to the attachment of the input device 200, the electronic apparatus 100 may identify a control function assigned to the area to which the input device 200 is attached and perform a control operation corresponding to a signal received from the input device 200 based on the identified control function. As described above, the electronic apparatus 100 may perform a control function corresponding to the signal received from the input device 200 as well as a physical operation with respect to a button provided in the input unit 170.

Figure 3D:
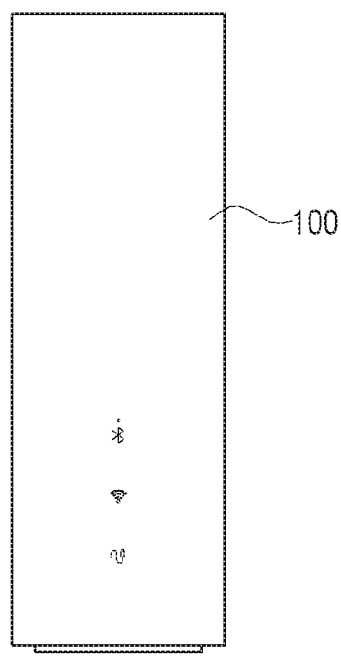

FIG. 3D is a right side view illustrating the electronic apparatus 100 according to an embodiment.

As described above, the electronic apparatus 100 may perform communication with an external device in a wireless manner using Bluetooth, Wi-Fi, etc. and in a wired manner using an AUX terminal, etc. The electronic apparatus 100 may include a display unit indicating a communication state with an external device, whether a communication module corresponding to each communication standard included in the electronic apparatus 100 is activated and whether the connection is established.

As an example, information on a communication method that can be supported by the electronic apparatus 100 (e.g., Bluetooth, Wi-fi, and AUX) may be provided in one area of the housing (e.g., a side area) of the electronic apparatus 100. For example, the information may be provided in the form of being printed or carved in the housing area of the electronic apparatus 100. Alternatively, when a display is provided in the housing area, the information may be displayed on the display.

An LED for indicating a communication state may be provided in the area where the information on each communication method is provided. For example, if a Bluetooth communication module is activated, a corresponding LED may be turned on. In some cases, it is also possible to emit light in a different light emitting state (e.g., different colors, different light emission patterns, etc.) by separating the state where the Bluetooth communication module is activated only in the electronic device 100 and the electronic device 100 is not paired with an external device (e.g., the input device 200) from the state where the Bluetooth communication module is activated only in the electronic device 100 but the electronic device 100 is paired with an external device.

Figure 3E:
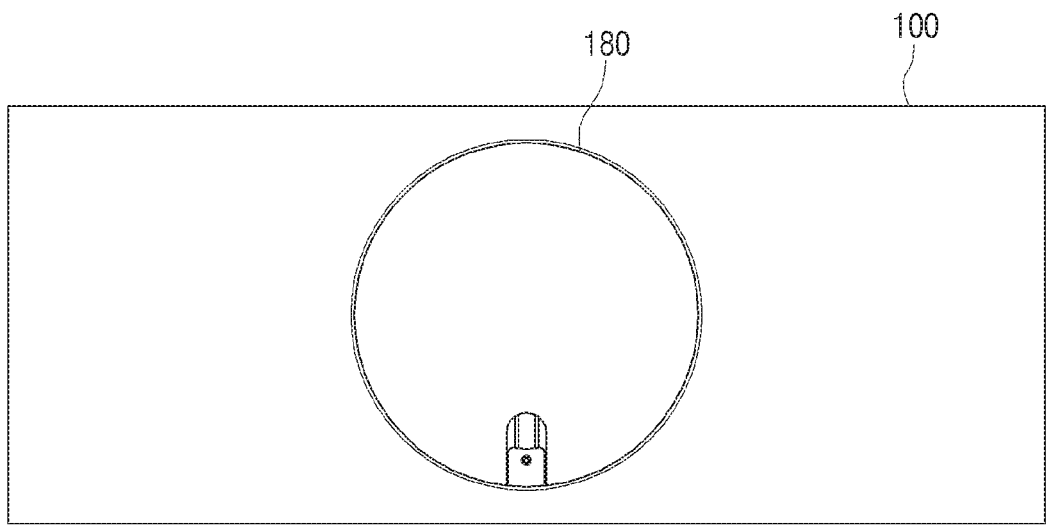
Figure 3F:
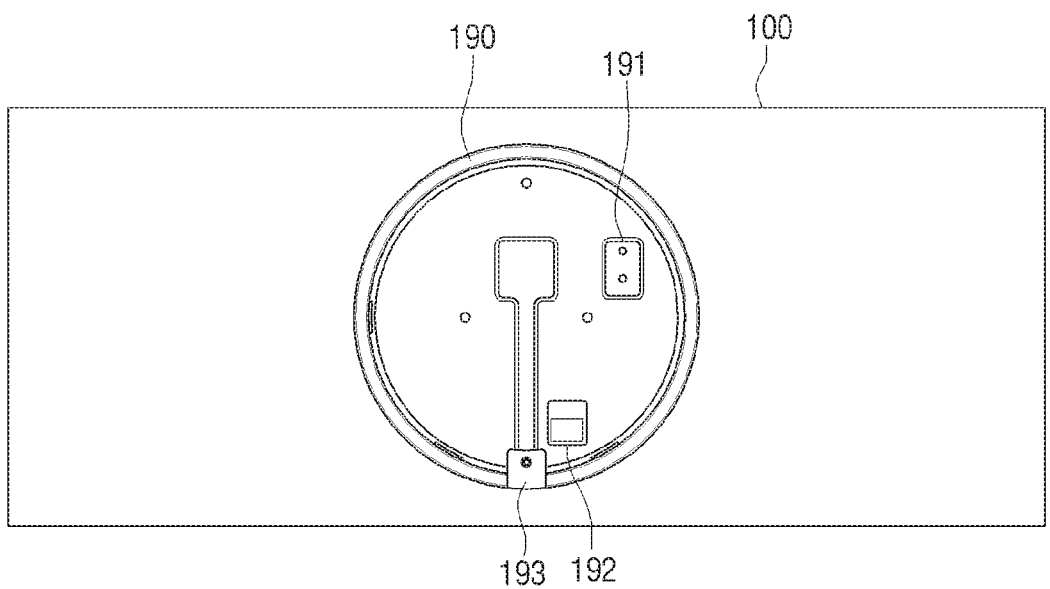

FIGS. 3E to 3F are rear views illustrating the electronic apparatus 100 according to an embodiment.

Referring to FIG. 3E, a plurality of communication terminals, a power terminal, etc. may be provided in one area 180 of the electronic apparatus 100 and covered by the cover 190 as shown in FIG. 3F. For example, the terminals may be provided on one area of the rear side of the electronic apparatus 100.

As shown in FIG. 3F, a terminal 191 for controlling network on/off and power source on/off may be provided. In addition, a LAN terminal 192 for receiving contents in connection with an external device, a cable connection terminal 193 (e.g., an AUX terminal), etc. may be provided. The electronic apparatus 100 may perform communication with an external device, an external source device and the input device 200 by using various terminals.

As shown in FIG. 3F, the cover 190 may be attached to or detached from the one area 180 of the electronic apparatus 100. In some cases, the cover 190 may be detached from the electronic apparatus 100 and operate as the input device 200. For example, the cover 190 may include at least one of a whirl button or a press button for receiving a physical operation of a user, or further include a communicator for performing communication with a body of the electronic apparatus 100 and transmitting a signal.

Figure 4:
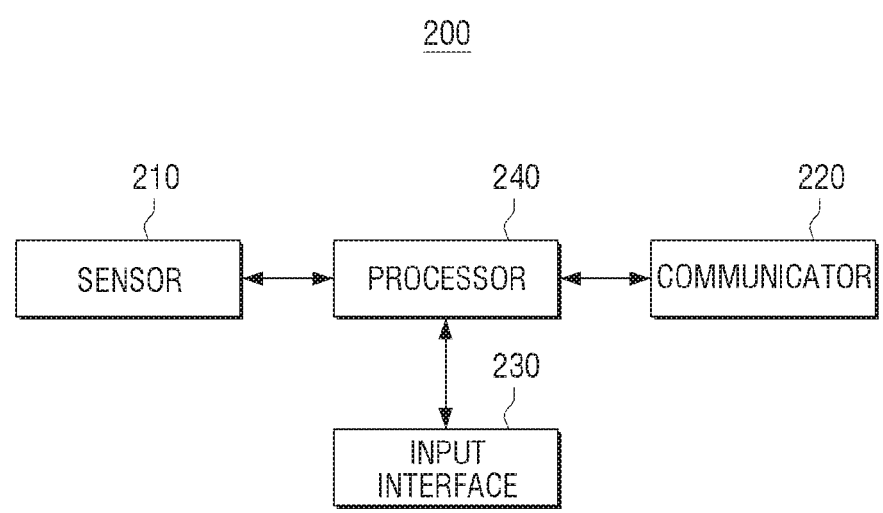
FIG. 4 is a block diagram illustrating an input device according to an embodiment.

FIG. 4 is a block diagram to explain an input device 200 according to an embodiment.

Referring to FIG. 4, an input device 200 may include a sensor 210, a communicator 220, an input unit 230 and a processor 240.

The input device 200 may be a device which is detachably attached to an external side (or a surface) of the electronic apparatus 100. When it comes to an engagement method using a magnetic material included in the electronic apparatus 100 and magnetic force of a magnetic material included in the input device 200, a magnetic substance may be included in the rear surface of the input device 200 to be attached to the electronic apparatus 100. A magnetic substance may be provided in each of the plurality of areas of the electronic apparatus 100 to be engaged with the rear surface of the input device 200.

The sensor 210 may detect whether the input device 200 is attached to or detached from the electronic apparatus 100.

For example, when the input device 200 has a characteristic resistance value, the input device 200 may detect whether the input device 200 is detached or attached based on a resistance value sensed by a sum of a characteristic resistance value of the area to which the input device 200 is attached and a characteristic resistance value of the input device 200. However, the present disclosure is not limited thereto. It should be noted that the sensor 110 provided in the electronic apparatus 100 may detect whether the input device 200 is attached and the area to which the input device 200 is attached.

The communicator 220 may perform communication with the electronic apparatus 100. The communicator 220 may include a Bluetooth communicator. The communicator 220 may automatically identify the electronic apparatus 100 when the electronic apparatus 100 and the input device 200 are disposed to be adjacent to each other within a predetermined range, Bluetooth communication pairing between the electronic apparatus 100 and the input device 200 may be completed and Bluetooth communication may be established However, the present disclosure is not limited thereto, but various wireless communication methods using Wireless Fidelity (WI-FI), Zigbee, Infrared (IR), etc. may be applied.

When the input device 200 is attached to one area of the electronic apparatus 100, communication between the input device 200 and the electronic apparatus 100 may be established by using a wired communication method, not a wireless communication method.

The communicator 220 may transmit a signal corresponding to a user input with respect to the input device 200 to the electronic apparatus 100.

The input unit 230 may include at least one of a whirl button and a press button. The input device 200 may be cylindrical and consist of a body and a housing. At least one press button may be provided at the upper side of the body, and the housing may be embodied as a body of rotation and operated by a whirl button. In other words, the input device 200 may generate a signal corresponding to a whirl operation of a user with respect to the whirl button and transmit the signal to the electronic apparatus 100. For example, the input device 200 may generate a signal corresponding to a whirl operation based on at least one of the rotation direction, the rotation speed and the rotation number with respect to the whirl button and transmit the signal to the electronic apparatus 100. In addition, the input device 200 may transmit a signal corresponding to a button operation with respect to the press button provided at the upper side of the body to the electronic apparatus 100.

When it is sensed by the sensor 210 that the processor 240 is attached to a predetermined area of the electronic apparatus 100, that is, one of a plurality of removable areas, the processor 240 may identify a control function assigned to the area to which the input device 200 is attached. The processor 240 may transmit a control signal generated corresponding to a physical operation with respect to the input unit 230 based on the identified control function to the electronic apparatus 100. However, the present disclosure is not limited thereto, but the processor 240 may transmit a control signal generated corresponding to the physical operation with respect to the input unit 230 to the electronic apparatus 100 and perform a control operation based on the control function assigned to the area to which the input device 200 is attached. Identification of the control function assigned to the area to which the input device 200 is attached may be performed by one of the electronic apparatus 100 or the input device 200.

Although the user's physical operation with respect to the input unit 230 is the same, the electronic apparatus 100 may perform a different control function according to the area to which the input device 200 is attached When the input device 200 is detached from the electronic apparatus 100, the processor 240 may transmit a control signal corresponding to a physical operation input through the input unit 230 based on the control function corresponding to the area to which the input device 200 is most recently attached to the electronic apparatus 100. For example, although the input device 200 is detached from the electronic apparatus 100, communication between the input device 200 and the electronic apparatus 100 may be maintained, and the electronic apparatus 100 may be controlled by the input device 200. In this case, a control signal may be generated based on the control function identified corresponding to the area where the input device 200 is most recently attached to the electronic apparatus 100 before detachment.

The input device 200 may further include a storage that stores information on a default control command corresponding to each of the physical operations with respect to the input unit 230. A control command generated corresponding to a physical operation with respect to a press button or a whirl button may be different according to the area to which the input device 200 is attached, but when the input device 200 is not attached to electronic apparatus 100, the control command may be generated based on the default control command stored in the storage. For example, based on sensing the detachment of the input device 200 and sensing the input of the physical operation with respect to the input unit 230, the processor 240 may generate a control signal based on the information on the default control command. When a whirl operation with respect to a whirl button is input while the input device 200 is detached, the input device 200 may generate a 'volume control signal' and transmit the signal to the electronic apparatus 100. However, the present disclosure is not limited thereto. The information on the default control command may be stored in the electronic apparatus 100. Accordingly, based on sensing the detachment of the input device 200, the electronic apparatus 100 may identify a specific control function based on the information on the default control command, and the electronic apparatus 100 may perform a control function corresponding to a signal received from the input device 200 based on the identified control function.

Figure 5A:
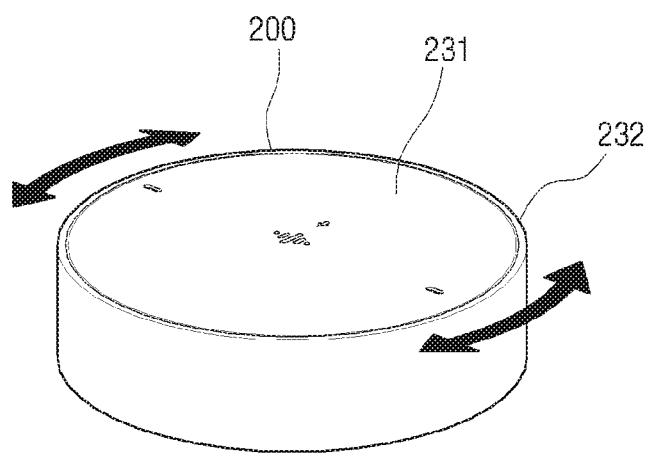
FIGS. 5A to 5B are views illustrating an input device according to one or more embodiments.
Figure 5B:
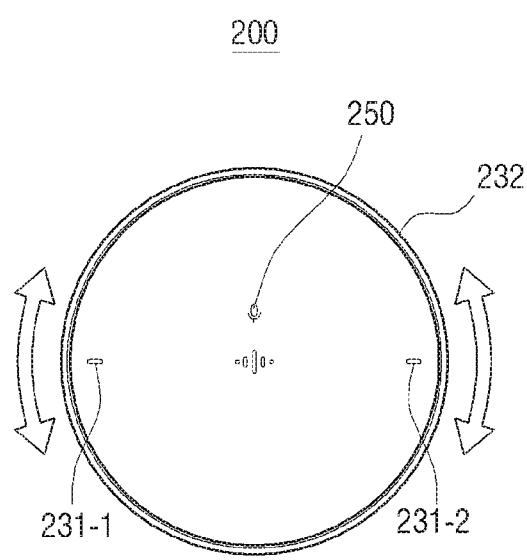

FIGS. 5A to 5B are views to explain an input device 200 according to an embodiment.

Referring to FIG. 5A, the input device 200 may be cylindrical and consist of a body 231 and a housing. The housing may be a rotatable structure as described above, and operated by a whirl button 232. According to a physical operation of a user with respect to the whirl button 232, the input device 200 may generate a signal and transmit the signal to the electronic apparatus 100. The input device 200 may identify an area where the input device 200 is attached to the electronic apparatus 100 and generate a control signal corresponding to a physical operation based on a control function assigned to the identified area, but the present disclosure is not limited thereto. The input device 200 may generate a signal corresponding to only the physical operation regardless of the area to which the input device 200 is attached and transmit the signal to the electronic apparatus 100. The electronic apparatus 100 may identify a control function assigned to the area to which the input device 200 is attached and perform a control operation corresponding to the received signal based on the identified control function (or the assigned control function).

Referring to FIG. 5B, the input device 200 may include at least one of press buttons 231-1 and 231-2 of the body 231. Also, the input device may include a microphone button 250 for receiving a user voice input through a microphone. As the input device 200 is attached to a specific area of the electronic apparatus 100, the press buttons 231-1 and 231-2 each may function as a button for operating a control function assigned to the area to which the input device 200 is attached. According to an embodiment, when the input device 200 is detached from the electronic apparatus 100, the press button may function as a button for operating the control function assigned to the area to which the input device 200 is attached before detachment. According to another embodiment, a control command corresponding to a physical operation may be transmitted to the electronic apparatus 100 based on the information on the default control command stored in the input device 200. The information on the default control command may be information on a control signal assigned to each of the press buttons 231-1 and 231-2 and the whirl button 232 included in the input device 200 as a default signal when the input device 200 is not attached to the electronic apparatus 100. For example, when the whirl button 232 is operated while the input device 200 is detached, the input device 200 may transmit a control signal for controlling a volume value of the electronic apparatus 100 to the electronic apparatus 100. In addition, a control signal regarding 'Next' or 'Previous' may be transmitted to the electronic apparatus 100 in response to the operation of the press buttons 231-1 and 231-2 included in the input device 200, and the electronic apparatus 100 may output a next content or a previous content of the content that is output in response to the received signal.

Figure 6:
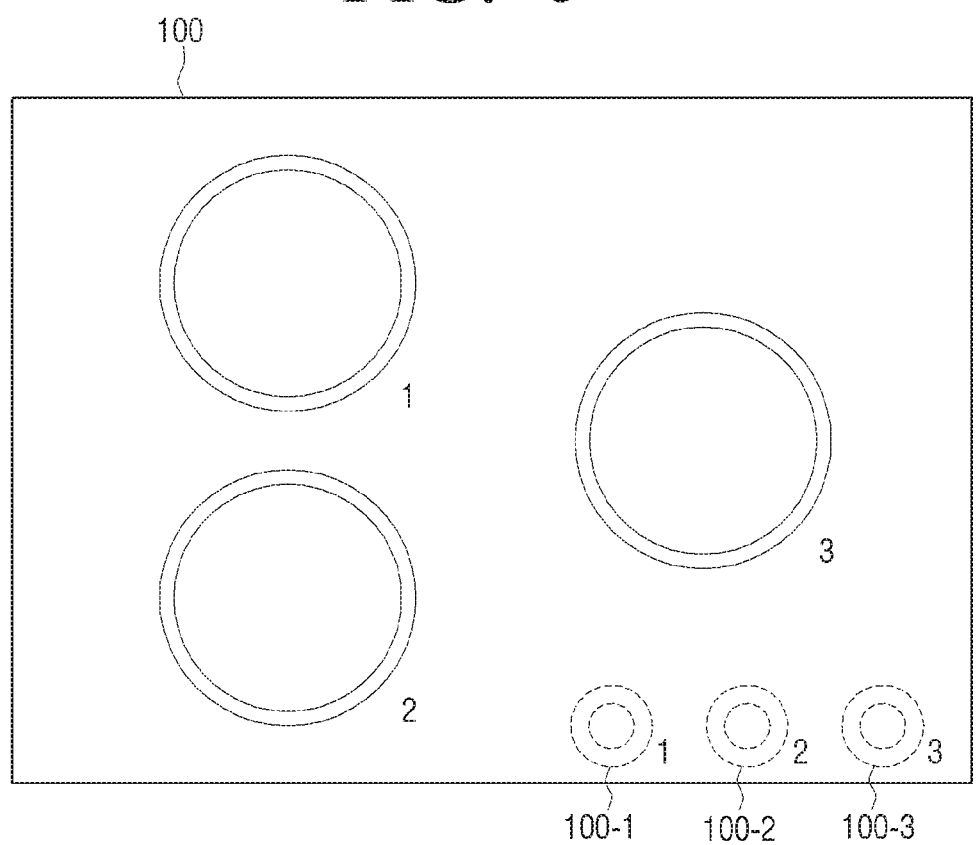
FIGS. 6, 7A and 7B are views illustrating an electronic apparatus system according to one or more embodiments.

FIG. 6 is a view to explain an electronic apparatus system according to another embodiment.

Referring to FIG. 6, an electronic apparatus system 1000 is not limited to a system that outputs contents such as a display system, a sound output system, etc. but may be embodied with various types of devices. For example, the electronic apparatus system 1000 may be embodied as a microwave oven (an induction) as shown in FIG. 6. The conventional microwave oven may be provided with a plurality of buttons (e.g., a touch based button) for setting a heat temperature in one area, and a large number of buttons may be provided in proportion to the increase in areas (areas 1 to 3) where a container can be placed on the microwave oven.

According to the electronic apparatus system 1000 according to an embodiment, a plurality of areas 100-1, 100-2 and 100-3 may be provided in one area of the microwave oven. Accordingly, the input device 200 may be attached to any one of the plurality of areas, and based on a physical operation with respect to the input device 200 being input, the input device 200 may transmit a heat temperature setting value of the area to which the input device 200 is attached to the microwave oven. The microwave oven may not need a plurality of buttons corresponding to the respective plurality of areas where the container can be placed, and heating temperatures of all the areas on the microwave oven may be set by attaching the input device 200 to different areas. For example, the input device 200 may be attached to the first area 100-1 and a signal corresponding to a whirl operation with respect to the input device 200 may be transmitted to the electronic apparatus 100. The electronic apparatus 100 may control a heat temperature of the area 1 corresponding to the first area in response to the received signal.

The electronic apparatus system 1000 is not limited to an apparatus that is capable of outputting sound contents or video contents, and as long as a physical button for controlling various functions and setting values of the electronic apparatus 100 is replaced by the input device 200, the electronic apparatus system 1000 could be applied to various embodiments of the present disclosure.

Figure 7A:
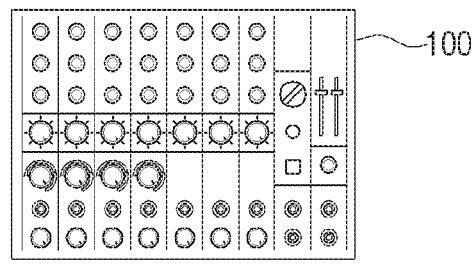
Figure 7B:
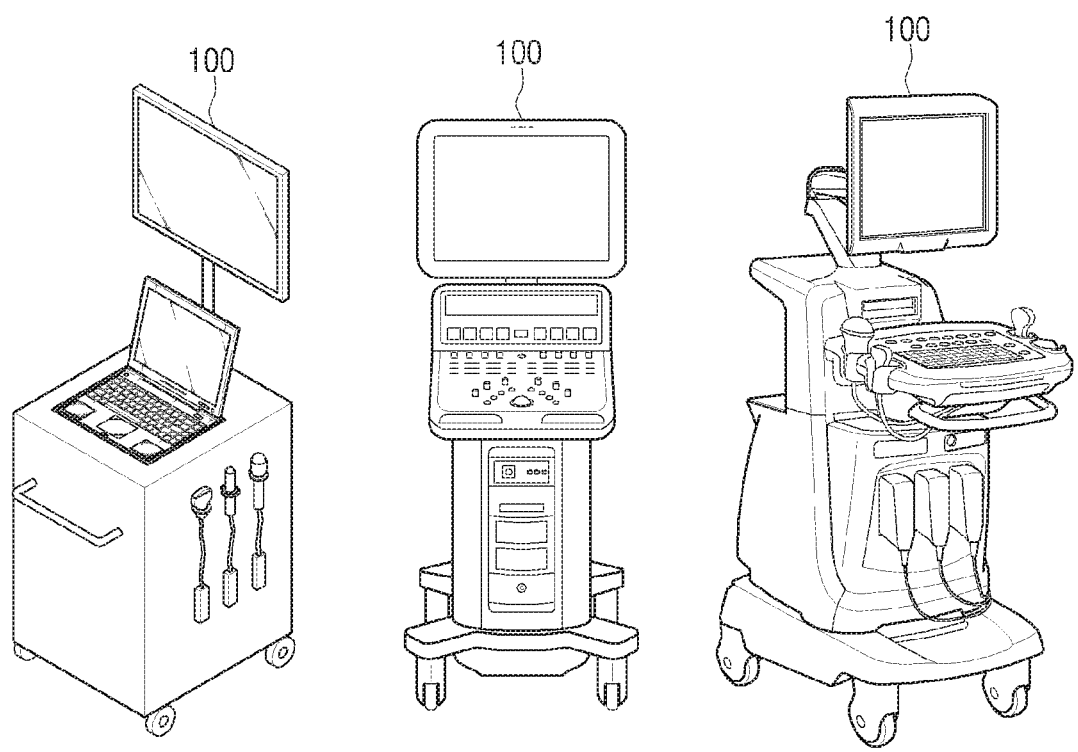

FIGS. 7A and 7B are views to explain an electronic apparatus system according to another embodiment.

The electronic apparatus 100 and the input device 200 are not limited to a display apparatus or a sound output apparatus that outputs contents, but may be embodied as various types of electronic apparatuses including a button that is physically operated as shown in FIGS. 7A and 7B.

Referring to FIG. 7A, a conventional sound control device, a sound mixer, etc. may include a plurality of physical buttons. In the sound mixer, the input device which is detachably attached to a plurality of areas may replace the plurality of buttons provided in respective areas. For example, the sound mixer may perform a function corresponding to the area to which the input device 200 is attached (e.g., an audio mixing function) and a control operation corresponding to a signal received from the input device 200 (e.g., gain adjustment). In this case, the input device 200 may control a different mixing function according to the area to which the input device 200 is attached without a physical button.

Referring to FIG. 7B, the conventional medical device may include a plurality of buttons that are physically operated such as a whirl button and a press button. As described above, when the electronic apparatus 100 is embodied as a medical device, a plurality of areas where the input device 200 is detachably attached may be provided in the medical device and a physical button corresponding to a function may not be provided.

Various embodiments of the present disclosure may be applied to various types of devices including a button that is controlled and operated by a user as well as display apparatuses, sound output apparatuses, etc.

Figure 8:
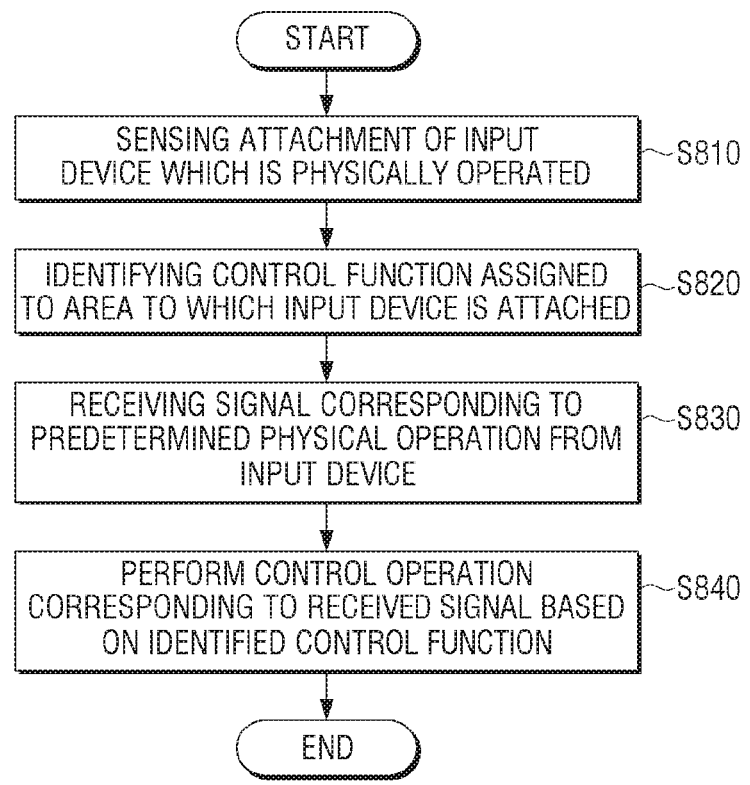
FIG. 8 is a flowchart illustrating a controlling method for an electronic apparatus according to an embodiment.

FIG. 8 is a flowchart to explain a controlling method for an electronic apparatus according to an embodiment.

As shown in FIG. 8, a controlling method for an electronic apparatus may include sensing the attachment of the input device which is physically operated at step S810.

A control function assigned to an area to which an input device is attached may be identified at step S820.

A signal corresponding to a predetermined physical operation may be received from an input device at step S830.

A control operation corresponding to a signal received based on the identified control function may be performed at step S840.

The step S810 of sensing the attachment of the input device may include, if a sensing value sensed by a sensor is a first sensing value, identifying that an input device is attached to a first area among a plurality of areas, and if a sensing value is a second sensing value, identifying that an input device is attached to a second area among a plurality of areas, and the step S820 of identifying a control function may include, based on sensing that the input device is attached to the first area, identifying a control function corresponding to the first area, and based on sensing that the input device is attached to the second area, identifying a control function corresponding to the second area.

The step S830 of receiving a signal may further include receiving a signal including a user voice input through a microphone included in the input device, and the step S840 of performing a control operation may include identifying a preset command corresponding to a user voice and performing a control operation corresponding to a preset command based on the identified control function.

The electronic apparatus may include a magnetic material in each of the plurality of areas of a body, and the step S820 of identifying a control function may include, based on an input device including a magnetic material being attached, identifying a control function mapped to identification information corresponding to a sensing value sensed in the area to which the input device is attached.

A controlling method according to an embodiment may further include, based on sensing the detachment of the input device and receiving a signal corresponding to a predetermined physical operation from the input device, performing a control operation corresponding to a signal received based on the control function corresponding to the area to which the input device is most recently attached.

In addition, a controlling method according to another embodiment may further include, based on sensing the detachment of the input device and receiving a signal corresponding to a specific physical operation from the input device, performing a control operation according to a control command corresponding to a physical operation based on information on a default control command corresponding to each of the plurality of physical operations.

The controlling method may further include, when the input device is attached to the area, providing power for charging the input device to a charging terminal arranged in the area.

The input device may receive at least one of a whirl operation and a button operation.

Meanwhile, the methods according to various embodiments of the present disclosure described above can be implemented by software upgrading or hardware upgrading for existing electronic apparatuses.

It is also possible that the various embodiments of the present disclosure described above are performed through an embedded server provided in an electronic apparatus or a server outside the electronic apparatus.

The various embodiments described above may be implemented in a recording medium that can be read by a computer or a similar device using software, hardware, or a combination thereof. In some cases, the embodiments described herein may be implemented by the processor itself. According to a software implementation, embodiments such as the procedures and functions described herein may be implemented in separate software modules. Each of the software modules may perform one or more of the functions and operations described herein.

Meanwhile, computer instructions for performing the processing operations according to various embodiments of the present disclosure described above may be stored in a non-transitory computer-readable medium. Computer instructions stored on such non-volatile computer-readable media may cause a particular device to perform processing operations according to various embodiments described above when executed by a processor.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although embodiments have been shown and described, it will be appreciated by those skilled in the art that changes may be made to these embodiments without departing from the principles and spirit of the present disclosure. Accordingly, the scope of the present invention is not construed as being limited to the described embodiments, but is defined by the appended claims as well as equivalents thereto.

What is claimed is:

1. An electronic apparatus, comprising:
   a sensor;
   a communicator; and
   a processor configured to:
      based on sensing an input device being attached to the electronic apparatus, identify an area where the input device is attached among a plurality of areas according to a sum of a resistance included in the area and a resistance included in the input device, each of the plurality of areas to which the input device is attachable comprises resistances that are different from each other,
   identify a control function assigned to the area; and
      based on receiving a signal corresponding to a predetermined physical operation from the input device through the communicator, perform a control operation corresponding to the received signal based on the identified control function.

2. The electronic apparatus as claimed in claim 1, further comprising:
   a storage configured to map and store information obtained by mapping identification information of each area among the plurality of areas where a different control function is assigned to each area,
   wherein the processor is further configured to:
      based on a sensing value sensed through the sensor being a first sensing value, identify that the input device is attached to a first area among the plurality of areas, and identify a control function corresponding to the first area based on the stored information; and based on the sensing value sensed through the sensor being a second sensing value, identify that the input device is attached to a second area among the plurality of areas, and identify a control function corresponding to the second area based on the stored information.

3. The electronic apparatus as claimed in claim 1, wherein the processor is further configured to, based on a signal corresponding to a user voice input through a microphone of the input device being received from the input device, identify a predetermined command corresponding to the user voice, and perform a control operation corresponding to the predetermined command based on the identified control function.

4. The electronic apparatus as claimed in claim 1, wherein the electronic apparatus comprises a magnetic material in each area among the plurality of areas in a body, and wherein the processor is further configured to, based on the input device being attached to an area, identify a control function mapped to identification information corresponding to a sensing value sensed in the area to which the input device is attached.

5. The electronic apparatus as claimed in claim 1, wherein the processor is further configured to, based on sensing the input device being detached, and receiving a signal corresponding to the predetermined physical operation from the input device, perform a control operation corresponding to the received signal based on a control function corresponding to the area to which the input device is most recently attached.

6. The electronic apparatus as claimed in claim 1, further comprising:

a storage configured to store information about a default control command corresponding to each of a plurality of physical operations, wherein the processor is further configured to, based on sensing the input device being detached, and receiving a signal corresponding to a physical operation from the input device, perform a control operation according to a control command corresponding to the physical operation based on the information stored in the storage.

7. The electronic apparatus as claimed in claim 1, further comprising:

a power supply, wherein the power supply is configured to, based on the input device being attached to the area, provide power for charging the input device to a charging terminal arranged in the area.

8. The electronic apparatus as claimed in claim 1, wherein the input device receives at least one from among a whirl operation and a button operation.

9. An input device that is removable from an electronic apparatus, the input device comprising:

a sensor;

a communicator;

an input interface comprising at least one from among a whirl button and a press button; and a processor configured to, based on sensing through the sensor that the input device is attached to an area among a plurality of areas of the electronic apparatus, identify an area where the input device is attached among the plurality of areas according to a sum of a resistance included in the area and a resistance included in the input device, each of the plurality of areas to which the input device is attachable comprises resistances that are different from each other, identify a control function with respect to the electronic apparatus which is assigned to the area, and control the communicator to transmit a control signal corresponding to a physical operation input through the input interface to the electronic apparatus based on the identified control function.

10. The input device as claimed in claim 9, wherein the processor is further configured to, based on sensing the input device being detached, transmit a control signal corresponding to a physical operation input through the input interface to the electronic apparatus based on a control function corresponding to the area of the electronic apparatus to which the input device is most recently attached.

11. The input device as claimed in claim 9, further comprising:

a storage configured to store information about a default control command corresponding to each physical operation with respect to the input interface, wherein the processor is further configured to, based on sensing the input device being detached, transmit a control signal corresponding to a physical operation input through the input interface to the electronic apparatus based on the information stored in the storage.

12. A method for controlling an electronic apparatus, the method comprising:

sensing an input device being attached;

identifying an area where the input device is attached among a plurality of areas according to a sum of a resistance included in the area and a resistance included in the input device, each of the plurality of areas to which the input device is attachable comprises resistances that are different from each other;

identifying a control function assigned to the area among the plurality of areas;

receiving a signal corresponding to a predetermined physical operation from the input device; and performing a control operation corresponding to the received signal based on the identified control function.

13. The method as claimed in claim 12, wherein the sensing the input device being attached comprises:

based on a sensing value sensed through a sensor being a first sensing value, identifying that the input device is attached to a first area among the plurality of areas, and based on the sensing value being a second sensing value, identifying that the input device is attached to a second area among the plurality of areas, and wherein the identifying of the control function comprises:

based on sensing that the input device is attached to the first area, identifying a control function corresponding to the first area, and based on sensing that the input device is attached to the second area, identifying a control function corresponding to the second area.

14. The method as claimed in claim 12, wherein the receiving of the signal further comprises:

receiving a signal corresponding to a user voice that is input through a microphone of the input device, wherein the performing of the control operation comprises identifying a predetermined command corresponding to the user voice and performing a control operation corresponding to the predetermined command based on the identified control function.

15. The method as claimed in claim 12, wherein the electronic apparatus includes a magnetic material in each area among the plurality of areas in a body, and wherein the identifying of the control function comprises, based on the input device being attached to an area, identifying a control function mapped to identification information corresponding to a sensing value sensed in the area to which the input device is attached.

16. The method as claimed in claim 12, further comprising:

based on sensing the input device being detached, and receiving a signal corresponding to the predetermined physical operation from the input device, performing a control operation corresponding to the received signal based on a control function corresponding to the area to which the input device is most recently attached.

17. The method as claimed in claim 12, further comprising:

based on sensing the input device being detached and receiving a signal, after the input device is detached, corresponding to a physical operation from the input device, performing a control operation according to a control command corresponding to the physical operation based on information about a default control command corresponding to each of a plurality of physical operations.

18. The method as claimed in claim 12, further comprising:

based on the input device being attached to an area, providing power for charging the input device to a charging terminal arranged in the area.

19. The method as claimed in claim 12, wherein the input device receives at least one from among a whirl operation and a button operation.

* * * * *